C. H. HUBBARD AND G. RUPPERT.

FAUCET FOR DELIVERING MOLTEN GLASS.

APPLICATION FILED JUNE 12, 1917.

Reissued Oct. 28, 1919. 14,745.

Inventors
Charles H. Hubbard
George Ruppert
By
Ralph T. Bassett
Attorney

UNITED STATES PATENT OFFICE.

CHARLES H. HUBBARD AND GEORGE RUPPERT, OF SAND SPRINGS, OKLAHOMA, ASSIGNORS TO ALEXANDER H. KERR, OF SAND SPRINGS, OKLAHOMA.

FAUCET FOR DELIVERING MOLTEN GLASS.

14,745. Specification of Reissued Letters Patent. Reissued Oct. 28, 1919.

Original No. 1,200,195, dated October 3, 1916, Serial No. 96,116, filed May 8, 1916. Application for reissue filed June 12, 1917. Serial No. 174,367.

*To all whom it may concern:*

Be it known that we, CHARLES H. HUBBARD and GEORGE RUPPERT, both citizens of the United States, residing in the city of Sand Springs, county of Tulsa, State of Oklahoma, have invented certain new and useful Improvements in Faucets for Delivering Molten Glass, of which the following is a specification.

Our invention relates to improvements in faucets for delivering molten glass and is particularly adapted for use in connection with glass furnaces where it is desired to withdraw regulated quantities of molten glass from the furnaces at suitable intervals.

The objects of the invention are, to provide a device of the class described in which the flow of glass from the receptacle may be arrested from time to time without danger of clogging the discharge orifice; to provide a faucet which is capable of delivering any desired quantity of molten glass when the same is open; to provide a construction in which the operation need not necessarily be automatic but may be arranged for manual control; to provide a construction such that the skill of the operator may be used, if desired, to determine the precise quantity of molten glass which shall be delivered from the furnace whenever the faucet is opened; to provide a construction so organized that the rate of discharge of the molten metal through the faucet may be regulated at will; to provide a construction which shall be absolutely non-clogging even if the faucet be maintained in closed condition for a length of time greater than the regular interval between successive openings of the device; to provide a construction which will regulate the fluidity or plasticity of the molten metal at will, independently of the fluidity of the molten glass contained in the furnace; to provide a device which shall be simple and inexpensive to construct and efficient and economical to operate and maintain, and, in general, to provide an improved construction of the character referred to.

Figure 1:
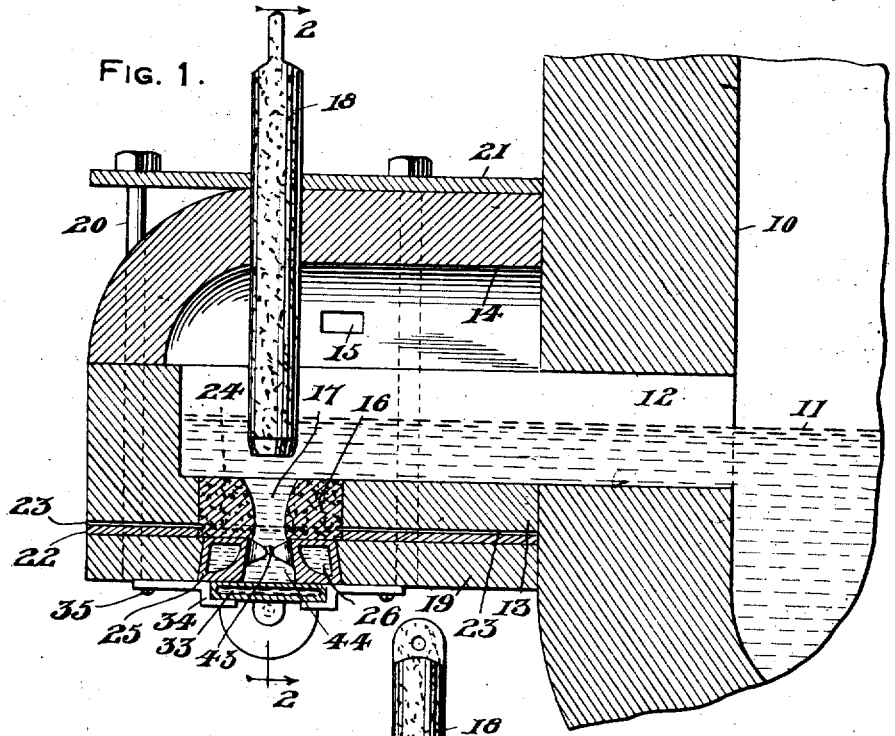
Figure 2:
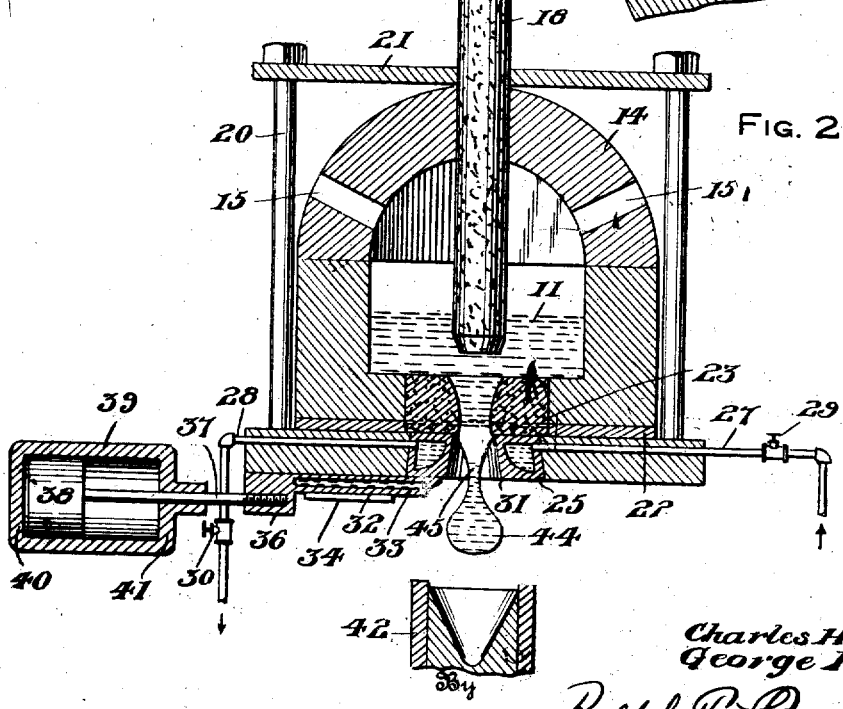

In the drawings which illustrate a preferred embodiment of our invention, Figure 1 is a vertical section of a fragmentary portion of the tank of the glass furnace to which our invention is applied; and Fig. 2 is a section taken on the line 2—2 of Fig. 1.

In the drawing, 10 represents the side or breast of the tank of the glass furnace containing molten glass 11. In the side of the tank we provide at the proper level an aperture or conduit 12 which communicates with a trough or boot 13 secured to the side of the tank. Said boot 13 is furnished with a cover portion 14 the opposite sides of which are perforated, as shown at 15, in order to admit streams of gaseous fuel for the purpose of heating the molten glass contained within the trough or boot 13 and so maintaining the proper degree of fluidity. The boot 13 and cover 14 are made of a refractory clay or other suitable fire-proof material, as is also the bushing 16 which is seated in the floor of the boot 13 and which is apertured, as shown at 17 in order to provide a discharge orifice for the molten glass. When it is desired to discontinue the delivery of glass from the tank for any extended period, we prefer to close the upper end of the aperture 17 by means of a fire-clay plug or rod 18 which may be raised or lowered through an aperture in the cover 14 in any suitable manner. Under the floor of the boot we mount a rather thick heavy plate 19 of cast iron or similar material which is supported by means of four rods or bolts 20 depending from the plate 21 placed on the top of the cover 14.

Between the plate 19 and the floor of the boot 13 we prefer to interpose a subsidiary metal plate 22 which surrounds the lower end of the clay bushing 16, and to which are detachably secured, in any suitable manner, on its upper side, a plurality of bars or rods 23 the inner ends of which enter a circumferential groove 24 cut in the exterior of the clay bushing 16. This arrangement makes it convenient to remove or replace the clay bushing 16 whenever desired. Immediately below the clay bushing 16 and concentric with its aperture 17 we insert in the plate 19 the removable metal bushing 25, the aperture in which is at its upper end slightly larger than the aperture 17 in the clay bushing, the diameter of the aperture at the lower end being also greater than at the support end. The walls of the said bushing 25 are made thick enough to accommodate an annular water chamber or jacket 26 for the purpose of cooling said metal bushing 25. A flow of cooling water through or around said water jacket 26 is furnished by means of an inlet pipe 27 and an outlet pipe 28 communicating at diametrically opposite points with the upper part of the water chamber. The flow of cooling fluid may be regulated by a pair of valves 29 and 30 arranged respectively in the inlet and exhaust pipes 27 and 28.

The bottom of the metal bushing 25 is turned or dressed off so as to constitute a smooth sharp shearing edge 31 with which coöperates a horizontally reciprocable shear blade 32 for the purpose of severing the stream of molten glass issuing from said bushing. The shear member 32, also, after its shearing movement, constitutes a gate which closes the bottom of the metal bushing 25, and thus arrests the further discharge of molten glass. Said shear blade or gate member 32 may if desired be water cooled as at 33, the cooling fluid being conveyed to the shear blade by means of a flexible conduit in any well-known manner.

The gate member or shear blade 32 is guided and maintained in working engagement with the bottom of the bushing 25 by means of a pair of opposed guide members 34 which are suitably secured to the under side of the plate 19, as by screws 35. The outer end of the gate member 32 is formed with a boss 36 for the reception of the rod 37 which actuates the shear blade through a piston 38 reciprocable in an air cylinder 39. It is understood that compressed air may be admitted to or exhausted from either end of the cylinder 39 by way of the ports 40 and 41, which may be controlled by any well known form of valve, the arrangement being such that an operator may move the gate member or shear in either direction at will.

In Fig. 2 we have shown diagrammatically a mold 42, which may be one of a series of molds of a glass molding machine and arranged to be moved successively into a position directly beneath the faucet so as to receive a supply of molten glass issuing therefrom. It should be understood, however, that the faucet is capable of being utilized with any type of mold or molding apparatus.

Describing the operation of the apparatus, Fig. 1 shows the condition a short time after the gate member has been moved inwardly by means of the piston 38 so as to arrest the discharge of glass into the mold. In said Fig. 1 it will be observed that immediately below the discharge orifice 17 in the clay bushing 16 the molten glass issuing from the clay bushing is conical in shape as at 43. When the flow of cooling water through the water chamber 26 is properly regulated by means of the valves 29 and 30, the outside of the said cone shaped stream is considerably cooler and consequently harder and less fluid than the central portion of the cone shaped discharge. The result is that the flow of glass takes place only at the lower end of the cone where the glass issuing from the bushing 16 possesses the greatest degree of fluidity. In Fig. 1 it will be seen that the molten glass which has flowed out of the end of the cone shaped discharge 43 has accumulated upon the top of the gate member, as shown at 44, and is in the act of sealing the end of the cone 43, thereby arresting further discharge of molten glass into the cavity of the bushing 25. It will be understood that the cooling of the water chamber 26 effects a slight hardening of the upper surface of the body of glass 44 and assists in preventing the body of glass 44 from quite filling up the cavity in the bushing 25, even though the gate member 32, be left in a closed position for a considerable length of time. When a new mold 42 has been brought into register beneath the faucet and whenever the operator is ready to fill the said mold, the gate member 32 is withdrawn and the body of glass 44, which has accumulated in the water cooled cavity, drops by gravity into the mold, as shown in Fig. 2 of the drawings. When this occurs, the flow of glass out of the lower end of the cone 43, which has been arrested by the accumulation of the body of glass 44 on top of the gate member, recommences. The weight of the gob 44 is of great importance in effecting a resumption of the flow of glass, by reason of the fact that its weight is sufficient to break the hardened connection between the cone 43 and the gob. The central or fluid portion of the cone 43 is thus drawn down by the falling gob and the glass discharges out of the lower end of the clay bushing, as shown in Fig. 2. When a sufficient quantity of molten glass has dropped into the mold, the operator cuts into the narrow neck 45 by means of the forward movement of the shear, thereby arresting the further flow of glass. By means of the valves 29 and 30 the operator is able to control the fluidity of the glass and the rate of discharge.

The fluidity of the gob may also to some extent be regulated by the length of time during which the gate member 32 is maintained in closed position. Where the apparatus is employed in conjunction with an automatic glass molding machine, the manual control makes it possible to regulate the operation with great nicety by reason of the fact that it is a simple matter to lengthen the intervals between the successive shear movements and thereby cool off the gobs of glass if the molds or other parts of the glass molding machine are becoming too hot, or in case the glass which is deposited in the molds is found to be of too high a temperature.

So far as we are aware, we are the first to employ an apparatus employing an intermittent discharge or a faucet in which it is possible to absolutely arrest the flow of glass between the successive discharges. This method of operation has important advantages over an apparatus with a continuous flow.

Although the amount of glass discharged in each mold may be held within the control of an operator and is not limited to the capacity of the bushing 25, we prefer to make the capacity of a size commensurate with the quantity of molten glass desired to be deposited in each mold, thus enabling the reduction to a minimum of the period between opening and closing movements of the gate member and consequently shortening the time during which it is necessary to position each mold of the molding machine under the faucet in order to deposit the required quantity of glass therein.

It will be seen that where it is desired to accumulate larger gobs of molten glass the flow of water is reduced and the shear is held in closed position a proportionate longer time. In this manner the chilling or hardening of the surface of the cone shaped discharge is more slowly performed and the flow consequently greater to the forming gob. The reverse is also true. When a small gob of molten glass is desired the cooling agent is permitted to flow freely and consequently the discharging cone shaped mass rapidly hardens on the surface and the lower end of the cone shaped discharge is smaller in diameter because of the increased hardening or chilling, resulting in a more slow and small discharge and consequent accumulation. In addition the shear will be operative proportionately faster.

Since the details of the invention may be varied without sacrificing its merits, benefits or advantages the scope of the invention must be determined by reference to the appended claims.

What we claim as new and useful and desire to secure by Letters Patent, is:—

1. In a faucet for delivering molten glass, the combination of a fire-proof receptacle containing fluid glass and provided at its under side with a downwardly directed discharge orifice, a metal inclosure under said orifice, its upper end being closed by the receptacle and in communication with said discharge orifice, means for opening and closing the bottom end of said inclosure, said inclosure when closed constituting a temporary receiver for limiting the flow of glass issuing from said orifice and being of greater cross-sectional area than said discharge orifice so that when the inclosure is open at its lower end the discharging stream of glass does not touch the inclosure, and means for cooling said inclosure and thereby chilling the unsupported surface of the stream of glass issuing from said orifice.

2. In a faucet for delivering molten glass, the combination of a fire-proof receptacle containing fluid glass and provided at its under side with a downwardly directed discharge orifice, an upwardly converging tapering metal inclosure under said orifice, its upper end being closed by the receptacle, and in communication with said discharge orifice, means for opening and closing the bottom end of said inclosure, said inclosure when closed constituting a temporary receiver for, and limiting the flow of, glass issuing from said orifice and being of greater cross-sectional area than said discharge orifice so that when the inclosure is open at its lower end the discharging stream of glass does not touch the inclosure and means for cooling the wall of said inclosure so as to chill the unsupported outer skin of the stream of glass issuing from said orifice.

3. An improved device for delivering molten glass including a container for holding fluid glass and provided with a discharge orifice, an inclosure immediately beneath and in communication with said discharge orifice, means for opening and closing the bottom end of said inclosure, said inclosure when closed being not greatly longer than it is wide and of greater cross sectional area than said discharge orifice so that when the inclosure is open at its lower end the discharging stream of glass does not touch the inclosure, and means for cooling said inclosure and thereby chilling the unsupported surface of the stream of glass issuing from said orifice.

4. In a faucet for delivering molten glass, a receptacle for containing molten glass having a discharge opening, means for chilling the glass issuing from the discharge opening whereby a hardened shell may be formed on the glass resisting flow except at the central portion of the issuing glass, means positioned adjacent the lower end of the chilling means for catching the glass flowing through said central portion and allowing same to accumulate and form a gob, said chilling and catching means forming a relatively short and wide inclosure the upper portion of the gob also being chilled by said first-named means whereby to seal the central flowing portion of the glass, said last-named means adapted to be withdrawn to permit the gob to fall and break the seal made by the gob with said central flowing portion of the glass.

5. In combination, a receptacle for containing molten glass having a discharge opening from the lower end of which the glass is adapted to emerge in gob formation, a relatively short and wide inclosure beneath the discharge opening having an aperture concentric therewith, cooling means for said inclosure adapted to chill the gob and form a hardened shell on the exterior thereof adapted to resist flow of the glass except at the central part of the gob, and a gate engaging the bottom of the inclosure beneath the aperture to catch the glass falling from the central part of the gob and allow some to accumulate in said inclosure and form a gob having its upper portion reduced and merging into the central part of said gob from which the gob is fed, said gate arranged to be withdrawn to permit the discharge of the formed gob and to be afterward returned to place to sever the flowing glass at a point above the gob.

6. In a faucet for delivering molten glass, the combination of a receptacle for containing fluid glass and having a discharge opening, a relatively short and wide inclosure beneath said discharge opening and having an aperture concentric with and larger at its upper end than said discharge opening whereby to induce the falling glass to assume an inverted cone formation suspended from the lower end of the discharge opening and extending within said inclosure, means to chill the inverted cone formation of glass hanging within said inclosure and form a hardened shell on the exterior thereof adapted to resist flow of the glass from the discharge opening except at the apex of the cone, and a gate at the bottom of said inclosure for catching the glass falling through said apex and allowing the glass to accumulate thereon and form a gob with the upper portion merging into an upright cone having an apex joining with the depending apex of the inverted cone formation, said gate adapted to be withdrawn to allow the joined gob within said inclosure to drop and later be moved back into place to sever the glass stream at a point above the lower cone-shaped gob.

7. In combination, a receptacle for containing molten glass having a discharge opening from which the glass is adapted to issue in gob formation, a relatively short and wide inclosure immediately beneath said discharge opening and having an aperture therein concentric with the discharge opening, the diameter of said aperture being greater at the lower part of said inclosure to accommodate a gob of glass, means for cooling said inclosure to chill the gob of glass and form a hardened shell on the exterior thereof adapted to resist flow of the glass except at the central part, and a gate engaging the bottom wall of the inclosure adapted to catch the glass issuing from said central part of the gob whereby such glass may accumulate in the lower part of the inclosure and form a gob having a reduced upper portion, said gate adapted to be withdrawn to allow the gob to fall and afterward returned to sever the gob at a point above the lower end.

8. In a faucet for delivering molten glass, the combination of a receptacle for containing fluid glass and having a discharge opening, a relatively short and wide inclosure immediately beneath said discharge opening and having an aperture concentric therewith, the aperture being larger at its upper end than the adjacent lower end of said discharge opening, said aperture also being flared downwardly, means for cooling said inclosure, and a gate movable back and forth across the lower end of said inclosure to open and close the aperture.

9. The method of delivering molten glass consisting in discharging a stream of glass downwardly, supporting the end of the stream of glass below its source until the stream between its source and said support assumes the shape of an hour glass, chilling the unsupported surface at the restricted point of the stream so that it will become substantially stationary in such hour glass formation, removing the support and allowing the portion below the restricted point to fall and then severing the glass at a point upwardy from the lower end thereof.

10. The method of delivering molten glass consisting in discharging a stream of molten glass downwardly, supporting the end of the stream of glass below its source until the stream between its source and said support assumes the shape of an hour glass, chilling the unsupported surface of said stream in such hour glass formation, removing the support and allowing the portion below the restricted point to fall and then severing the glass at a point upwardly from the lower end thereof.

11. The method of delivering molten glass consisting in discharging a stream of molten glass downwardly through an inclosed passage, supporting the end of the stream at a point adjacent the lower end of said passage until it assumes the shape of an hour glass, chilling the unsupported surface of the stream so that it will become substantially stationary in such hour glass formation, removing the support and allowing the portion below the restricted point to fall and then severing the glass at a point upwardly from the lower end thereof.

12. In a faucet for delivering molten glass, the combination of a receptacle for containing fluid glass and provided with a downwardly directed discharge orifice, an inclosure in communication with said discharge orifice through which a stream of glass from said orifice is adapted to pass, means for opening and closing the bottom end of said inclosure, and forming a temporary support for the lower end of the stream of glass, the passage through said inclosure being of greater cross-sectional area than said discharge orifice and the inclosure being formed with an annular chamber of upwardly increasing cross-sectional area for receiving a cooling medium so that the cooling effect will be greatest at a distance from the bottom of the inclosure.

CHARLES H. HUBBARD.
GEORGE RUPPERT.